US012600859B2

(12) United States Patent
Sparks et al.

(10) Patent No.: US 12,600,859 B2
(45) Date of Patent: Apr. 14, 2026

(54) POLYAMIDE COMPOSITIONS WITH HIGH HEAT PERFORMANCE

(71) Applicant: Ascend Performance Materials Operations LLC, Houston, TX (US)

(72) Inventors: Bradley J. Sparks, Houston, TX (US); Jacob G. Ray, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 632 days.

(21) Appl. No.: 18/067,055

(22) Filed: Dec. 16, 2022

(65) Prior Publication Data

US 2023/0193026 A1 Jun. 22, 2023

Related U.S. Application Data

(60) Provisional application No. 63/291,038, filed on Dec. 17, 2021.

(51) Int. Cl.

| | |
|---|---|
| *C08L 77/06* | (2006.01) |
| *C08K 3/013* | (2018.01) |
| *C08K 3/08* | (2006.01) |
| *C08K 3/22* | (2006.01) |
| *C08K 3/40* | (2006.01) |
| *C08K 5/00* | (2006.01) |
| *C08K 7/14* | (2006.01) |
| *C08L 77/02* | (2006.01) |

(52) U.S. Cl.

CPC ............... *C08L 77/06* (2013.01); *C08K 3/08* (2013.01); *C08K 3/22* (2013.01); *C08K 7/14* (2013.01); *C08L 77/02* (2013.01); *C08K 3/013* (2018.01); *C08K 2003/085* (2013.01); *C08K 2003/221* (2013.01); *C08K 2003/2248* (2013.01); *C08K 3/40* (2013.01); *C08K 5/0041* (2013.01); *C08L 2201/08* (2013.01); *C08L 2203/20* (2013.01)

(58) Field of Classification Search
None
See application file for complete search history.

(56) References Cited

U.S. PATENT DOCUMENTS

| | | | |
|---|---|---|---|
| 4,707,513 | A | 11/1987 | Baer |
| 7,858,172 | B2 | 12/2010 | Imaizumi et al. |
| 8,192,664 | B2 | 6/2012 | Polk, Jr. et al. |
| 8,658,757 | B2 | 2/2014 | Uehira et al. |
| 9,969,882 | B2 | 5/2018 | Thomas et al. |
| 2018/0171141 | A1 | 6/2018 | Thomas et al. |
| 2020/0247994 | A1 | 8/2020 | Sparks et al. |
| 2021/0277203 | A1 | 9/2021 | Gopal et al. |

FOREIGN PATENT DOCUMENTS

| | | |
|---|---|---|
| CN | 105219075 A | 1/2016 |
| EP | 1832624 A1 | 9/2007 |
| EP | 2535365 A1 | 12/2012 |
| GB | 904 972 A | 9/1962 |
| TW | 408148 B | 10/2000 |

OTHER PUBLICATIONS

Chen et al., "The influence of 1,4-cyclohexanedicarboxylic acid on the thermal and mechanical properties of copolyamides", Polymer Bulletin, Springer, Heidelberg, DE, vol. 77, No. 1, Mar. 16, 2019, pp. 235-253.

International Application No. PCT/US2022/081731, International Search Report and Written Opinion, mailed on Mar. 31, 2023, 17 pages.

*Primary Examiner* — Marc S Zimmer
*Assistant Examiner* — Virginia L Stonehocker
(74) *Attorney, Agent, or Firm* — Womble Bond Dickinson (US) LLP

(57) ABSTRACT

A polyamide composition comprising from 25 wt % to 90 wt % of a first polyamide comprising a non-aromatic polyamide formed from 50 wt % to 90 wt % PA66; from 10-50 wt % of a second polyamide comprising a polyamide copolymer; from 0.01-10 wt % of a first stabilizer comprising a lanthanoid-based compound; from 0.01-10 wt % of a second stabilizer comprising a copper-based compound; and from 0-65 wt % filler.

22 Claims, No Drawings

POLYAMIDE COMPOSITIONS WITH HIGH HEAT PERFORMANCE

CROSS-REFERENCE

This application is related to and claims priority to U.S. Provisional Patent Application No. 63/291,038 filed Dec. 17, 2021, which is incorporated herein by reference.

FIELD

The present disclosure relates to polyamides having high heat performance characteristics, particularly at temperatures between 200° C. and 220° C.

BACKGROUND

Conventional polyamides are generally known for use in many applications including, for example, textiles, automotive parts, carpeting, and sportswear.

In some of these applications, the polyamides in question may be exposed to high temperatures, e.g., on the order of 150° C. to 250° C. It is known that, when exposed to such high temperature, a number of irreversible chemical and physical changes affect the polyamide, which manifest themselves through several disadvantageous properties. The polyamide may, for example, become brittle or discolored. Furthermore, desirable mechanical properties of the polyamide, such as tensile strength and impact resilience, typically diminish from exposure to high temperatures. Thermoplastic polyamides, in particular, are frequently used in the form of glass fiber-reinforced molding compounds in construction materials. In many cases, these materials are subjected to increased temperatures, which lead to damage, e.g., thermooxidative damage, to the polyamide.

In some cases, heat stabilizers or heat stabilizer packages may be added to the polyamide mixture in order to improve performance, e.g., at higher temperatures. The addition of conventional heat stabilizer packages has been shown to retard some thermooxidative damage, but typically these heat stabilizer packages merely delay the damage and do not permanently prevent it. In addition, some (most) conventional stabilizer packages have been found to be ineffective over higher temperature ranges, e.g., over particular temperature gaps.

In addition, conventional stabilizer packages have been found to be ineffective over higher temperature ranges, e.g., over particular temperature gaps such as from 180° C. to 240° C. or from 190° C. to 220° C. For instance, the 190° C. to 220° C. temperature range, is a range over which a reduction in polyamide tensile properties (of polyamide stabilized with conventional heat stabilizer packages) is commonly seen. This temperature range is particularly relevant to many automotive engine-related applications.

Polyamides that employ certain conventional copper-based stabilizers yield polyamides that have performance gaps at temperatures above 180° C., e.g., above 200° C. Similarly, polyamides that employ certain conventional polyol-based stabilizers yield polyamides that have performance gaps at temperatures above 190° C., e.g., above 210° C. Further, polyamide compositions that employ a minor portion of certain conventional caprolactam-containing polymers have been found to perform well at higher temperatures, e.g., over 220° C., but perform poorly in the 180° C. to 210° C. gap or the 200° C. to 220° C. gap. Thus, when those polyamides are exposed to these temperatures, the polyamides perform poorly, e.g., in terms of tensile strength and/or impact resilience, inter alia.

Further, while many of these stabilizers may improve performance at some temperatures, each stabilizer package often presents its own set of additional shortcomings. Stabilizer packages that utilize iron-based stabilizers, for example, are known to require a high degree of precision in the average particle size of the iron compound, which presents difficulties in production. Furthermore, some of these iron-based stabilizer packages demonstrate stability issues, e.g., the polyamide may degrade during various production stages. As a result, the residence time during the various stages of the production process must be carefully monitored. Similar issues have been reported to be present in polyamides that utilize zinc-based stabilizers.

As one example of a conventional stabilized composition, EP 2535365A1 discloses a polyamide molding compound comprising: (A) a polyamide mixture (27-84.99 wt %) comprising (A1) at least one semiaromatic, semicrystalline polyamide having a melting point of 255-330° C., and (A2) at least one caprolactam-containing polyamide that is different from the at least one semiaromatic, semicrystalline polyamide (A1) and that has a caprolactam content of at least 50 wt %; (B1) at least one filler and reinforcing agent (15-65 wt %); (C) at least one thermal stabilizer (0.01-3 wt %); and (D) at least one additive (0-5 wt %). The polyamide molding compound comprises: (A) a polyamide mixture (27-84.99 wt %) comprising (A1) at least one semiaromatic, semicrystalline polyamide having a melting point of 255-330° C., and (A2) at least one caprolactam-containing polyamide that is different from the at least one semiaromatic, semicrystalline polyamide (A1) and that has a caprolactam content of at least 50 wt %. The sum of the caprolactam contained in polyamide (A1) and polyamide (A2) is 22-30 wt %, with respect to the polyamide mixture. The polyamide mixture further comprises: (B1) at least one filler and reinforcing agent (15-65 wt %); (C) at least one thermal stabilizer (0.01-3 wt %); and (D) at least one additive (0-5 wt %). No metal salts and/or metal oxides of a transition metal of the groups VB, VIB, VIIB or VIIIB of the periodic table are present in the polyamide molding compound.

GB 904,972 discloses a stabilized polyamide containing as stabilizers 0.5 to 2% by weight of hypophosphoric acid and/or a hypophosphate and 0.001 to 1% by weight of a water soluble cerium (III) salt and/or a water-soluble titanium (III) salt. Specified hydrophosphates are lithium, sodium, potassium, magnesium, calcium, barium, aluminum, cerium, thorium, copper, zinc, titanium, iron, nickel and cobalt hypophosphates. Specified water-soluble cerium (III) and titanium (III) salts are the chlorides, bromides, halides, sulphonates, formates and acetates. Specified polyamides are those derived from caprolactam, caprylic lactam, o-amino-undecanoic acid, the salts of adipic, suberic, sebacic or decamethylene dicarbonic acid with hexamethylene or decamethylene diamine, of heptane dicarboxylic acid with bis-(4-aminocyclohexyl)-methane, of tetramethylene diisocyanate and adipic acid and of aliphatic w-amino-alcohols and dicarboxylic acids each with 4 to 34 carbon atoms between the functional groups. The stabilizers may be added to the polyamides during or after the polycondensation reaction. Delustrants, e.g. cerium dioxide, titanium dioxide, thorium dioxide or ytrium trioxide may also be added to the polyamides. Examples (1) and (2) describe the polymerization of: (1) hexamethylene diammonium adipate in the presence of disodium dihydrogen hypophosphate hexahydrate and (a) titanium (III) chloride hexahydrate, (b) cerium (III) chloride; (2) caprolactam in the presence of (a)

thorium hypophosphate and titanium (III) chloride hexahydrate, whilst in Example (3) polycaprylic lactam is mixed with tetrasodium hypophosphate, titanium (III) acetate and titanium dioxide.

Also, EP 1832624A1 discloses the use of a radical catcher for the stabilization of organic polymer against photochemically, thermally, physically and/or chemically induced dismantling through free radical, preferably against UV-light exposure. Cerium dioxide is used as an inorganic radical catcher. Independent claims are included for: (1) a polymer composition comprising cerium dioxide, a UV-absorber and/or a second radical catcher; (2) agent for the stabilization of organic polymer comprising a combination of cerium dioxide, a UV-absorber and/or at least a second radical catcher; and (3) a procedure for the stabilization of organic polymer, preferably in the form of polymer based formulation, lacquer, color or coating mass against photochemically, thermally, physically and/or chemically induced dismantling through free radical, comprising mixing cerium dioxide as inorganic radical catcher, optionally in combination with the UV-absorber or with the second radical catcher.

And, U.S. Pat. No. 9,969,882 discloses polyamide molding compounds which have an improved resistance to heat-aging and comprise the following compositions: (A) 25 to 84.99 wt. % of at least one polyamide, (B) 15 to 70 wt. % of at least one filler and reinforcing means, (C) 0.01 to 5.0 wt. % of at least one inorganic radical interceptor, (D) 0 to 5.0 wt. % of at least one heat stabilizer which is different from the inorganic free-radical scavenger under (C), and (E) 0 to 20.0 wt. % of at least one additive. The invention further relates to molded articles produced from these polyamide molding compounds as components in the automobile or electrics/electronics sector.

Even in view of the references, the need exists for improved polyamide compositions, including polyamide compositions that contain two different polyamides, that demonstrate superior performance over a broad temperature range, in particular, that demonstrates significant improvements in tensile strength and impact resilience (among other performance characteristics) at higher temperature ranges, e.g., above 190° C. or from 200° C. to 220° C.

SUMMARY

In some embodiments, the disclosure relates to a polyamide composition comprising from 25 wt % to 90 wt % (or from 30 wt % to 45 wt %) of a first non-aromatic polyamide formed from 50 wt % to 90 wt % PA66, e.g., PA-66/6C; from 10-50 wt % of a second polyamide comprising a polyamide copolymer, e.g., PA-66/6; from 0.01-10 wt % (or from 0.1 wt % to 1 wt %) of a first stabilizer comprising a lanthanum-based compound, e.g., lanthanum hydroxide; and from 0.01-10 wt % (or from 1 wt % to 5 wt %) of a second stabilizer comprising a copper-based compound. The polyamide composition, wherein, when heat aged for 3000 hours at a temperature of 210° C., demonstrates an impact resistance of 28 kJ/m² or greater (or 30 kJ/m² or greater), as measured at 23° C.; or when heat aged for 3000 hours at a temperature of 210° C., demonstrates an increased impact resistance of 25% or more (or 30% or more, or 35% or more), as measured at 23° C., when compared to a similar polyamide composition that does not contain a lanthanum-based compound. The composition may also contain from 0-65 wt % (or from 25 wt % to 50 wt %) filler, e.g., glass fiber, and may also contain a third polyamide.

In other embodiments, the disclosure relates to an article formed from a polyamide composition comprising from 25 wt % to 90 wt % (or from 30 wt % to 45 wt %) of a first non-aromatic polyamide formed from 50 wt % to 90 wt % PA66, e.g., PA-66/6C; from 10-50 wt % of a second polyamide comprising a polyamide, e.g., PA-66/6; from 0.01-10 wt % (or from 0.1 wt % to 1 wt %) of a first stabilizer comprising a lanthanum-based compound, e.g., lanthanum hydroxide; and from 0.01-10 wt % (or from 1 wt % to 5 wt %) of a second stabilizer comprising a copper-based compound. Suitable articles include fasteners, circuit breakers, terminal blocks, connectors, automotive parts, furniture parts, appliance parts, cable ties, sports equipment, gun stocks, window thermal breaks, aerosol valves, food film packaging, automotive/vehicle parts, textiles, industrial fibers, carpeting, and electrical/electronic parts.

DETAILED DESCRIPTION

As noted above, conventional polyamide compositions typically utilize heat stabilizer packages to address high temperature performance. Unfortunately, many of these heat stabilizer packages, standing alone, suffer from stability/performance gaps over broad temperature ranges, e.g., between 190° C. and 220° C. temperature range. As a result, the polyamide structures formed from the compositions are prone to performance and/or structural failures.

This disclosure relates to polyamide compositions containing at least two amide polymers (optionally three or more) that provide for significant improvements in performance, e.g., tensile strength and/or impact resilience, at higher temperatures and under heat age conditions. The inventors have found that these (combinations of) polymers provide for or contribute to these surprising performance improvements (irrespective of heat stabilizer package). In some cases, the disclosed polyamide compositions comprises a first polyamide comprising a non-aromatic polyamide formed from 50 wt % to 90 wt % PA66, e.g., PA66/6C, and a second polyamide. And the combination of polyamides contributes to the aforementioned performance benefits. Because of the improvements in heat age performance, the need for stabilizer packages (to achieve the desired results) can be reduced or eliminated, which leads to process efficiencies, especially in view of the fact that many stabilizer packages contain expensive metal components.

The polyamide compositions disclosed herein have been found to demonstrate high tensile strength after heat aging. More specifically, the polyamide compositions have been surprisingly found to achieve significant performance improvements at temperatures ranging from 200° C. to 220° C., e.g., across this entire temperature range, or at 210° C., especially when exposed to heat aging at such temperatures for prolonged periods of time. This temperature range is where many polyamide structures are utilized, for example in automotive applications. Exemplary automotive applications may include a variety of "under-the-hood" uses, such as cooling systems for internal combustion engines; exemplary automotive applications may also include turbo chargers, and charge air cooler systems, which expose the polyamide to high temperatures.

Polyamide

The disclosed polyamide compositions comprise a first polyamide and a second polyamide. Additional polyamides may also be included in the polyamide composition.

First Polyamide

The first polyamide is a non-aromatic polyamide, e.g., an aliphatic polyamide or a cycloaliphatic polyamide.

In some cases, the first polyamide comprises (or is formed from) 40 wt % to 90 wt % PA66 (also referred to as PA-6,6, polyamide 6/6, and nylon 6/6). In certain embodiments, the non-aromatic polyamide is formed from 50 wt % to 90 wt %, 55 wt % to 85 wt % PA66, 60 wt % to 85 wt % PA66, 60 wt % to 80 wt % PA66, 60 wt % to 75 wt % PA66, or 65 wt % to 75 wt % PA66. In terms of upper limits, the non-aromatic polyamide is formed from less than 90 wt % PA66, e.g., less than 80 wt %, less than 70 wt %, or less than 60 wt %. In terms of lower limits, the non-aromatic polyamide is formed from greater than 50 wt % PA66, e.g., greater than 60 wt %, greater than 70 wt %, or greater than 80 wt %.

The non-aromatic polyamide may be a copolymer, such as a cycloaliphatic copolymer where one component of the copolymer is an aliphatic polyamide, such as PA66. The other component of the copolymer may be an aliphatic diacid/diamine such cyclohexane diacid/diamine, in which the diacid may be cyclohexane diacid, adipic acid, or other diacids known to those of skill in the art. In one embodiment, the copolymer is formed from PA66 and cyclohexane diacid. Stated another way, the copolymer may comprise PA66 and cyclohexane diacid segments.

The amount of second component, for instance the diacid/diamine or 6C, present in the copolymer may range from 10 wt % to 50 wt %, e.g., from 15 wt % to 45%, from 20 wt % to 40 wt %, or from 25 wt % to 35 wt %. In terms of upper limits, the second component is present in the copolymer in amounts of less than 50 wt %, e.g., less than 40 wt %, less than 30 wt %, less than 20 wt %, or less than 10 wt %. In terms of lower limits, the second component is present in the copolymer in amounts of greater than 10 wt %, e.g., greater than 20 wt %, greater than 30 wt %, or greater than 40 wt %.

In one embodiment, the copolymer is PA66/6C. PA66/6C is an example of a semicrystalline polymer. And this structure may provide for synergies. For example, it has been found that PA66/6C synergistically interacts with its accompanying polyamides. Without being bound by theory, it is postulated that the non-aromatic (planar) structure of PA66/6C allows it to better crystallize/co-crystallize with the acids of the other polyamides, e.g., adipic acid or cyclohexane diacid, more so than with some aromatic polyamides, which do not have such a planar structure and as such are less likely to crystallize/co-crystallize with acids. This crystallization is believed to provide for the aforementioned synergistic performance benefits.

In some cases, the PA66/6C has been found to provide for surprising improvements in high temperature damping, as well as tensile strength and impact resistance. In some cases, the first polyamide has been found to improve the reduction in stiffness properties, e.g., tensile modulus. This unexpected improvement may be particularly evident when measured at (operating) temperature, e.g., temperatures at which the polyamide composition is employed.

It has also been found that, when some polyamides, e.g., PA66/6C, are utilized, lesser amounts of the (other) polyamide(s), e.g., the lesser amounts disclosed herein, may be needed to provide the desired improvements. Thus, greater amounts of higher performance polymers can be employed, which surprisingly results in advantageous mechanical performance increases.

In some embodiments, the amount of the first polyamide, for instance the PA66/6C, present in the polyamide composition ranges from 25 wt % to 90 wt %, e.g., from 25 wt % to 80 wt %, from 25 wt % to 75 wt %, from 30 wt % to 60 wt %, from 30 wt % to 50 wt %, from 30 wt % to 45 wt %, or from 35 wt % to 45 wt %. In terms of upper limits, the first polyamide can be present in amounts of less than 90 wt %, e.g., less than 80 wt %, less than 70 wt %, less than 60 wt %, less than 50 wt %, less than 40 wt %, or less than 30 wt %. In terms of lower limits, the first polyamide can be present in amounts of greater than 25 wt %, e.g., greater than 30 wt %, greater than 40 wt %, greater than 50 wt %, greater than 60 wt %, greater than 70 wt %, or greater than 80 wt %.

The weight percentage ranges and limits discussed herein are based on the total weight of the polyamide composition, unless indicated otherwise.

Second Polyamide

The second polyamide may be any polyamide known to one skill in the art, as long as the second polyamide differs from the first polyamide. There can be one second polyamide in the composition, or more than one second polyamide. Many varieties of natural and artificial polyamides are known and may be utilized in the formation of the polyamide. Common polyamides include nylons and aramids. For example, the second polyamide may be PA-4T/4I; PA-4T/6I; PA-5T/5I; PA-6; PA-6,6; PA-6,6/6; PA-6,6/6C; PA-6,6/6T; PA-6T/6I; PA-6T/6I/6; PA-6T/6; PA-6T/6I/66; PA-6T/MPDMT (where MPDMT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; or PA-6T/6I/12.

The second polyamide may be an aliphatic polyamide such as polymeric E-caprolactam (PA6) or polyhexamethylene adipamide (PA66), other aliphatic nylons, polyamides with aromatic components such as paraphenylenediamine and terephthalic acid, or a polyamide copolymer that includes components such as adipate with 2-methyl pentmethylene diamine and 3,5-diacarboxybenzenesulfonic acid or sulfoisophthalic acid in the form of its sodium sultanate salt. The second polyamide can include polyaminoundecanoic acid and polymers of bis-paraaminocyclohexyl methane and undecanoic acid. Other suitable polyamides include poly(aminododecanoamide), polyhexamethylene sebacamide, poly(p-xylyleneazeleamide), poly(m-xylylene adipamide), and polyamides from bis(p-aminocyclohexyl)methane and azelaic, sebacic and homologous aliphatic dicarboxylic acids. As used herein, the terms "PA6 polymer" and "PA6 polyamide polymer" also include copolymers in which PA6 is the major component. As used herein the terms "PA66 polymer" and "PA66 polyamide polymer" also include copolymers in which PA66 is the major component. In some embodiments, copolymers such as PA-6,6/6I; PA-6I/6T; or PA-6,6/6T, or combinations thereof are contemplated for use as the polyamide polymer. In some cases, physical blends, e.g., melt blends, of these polymers are contemplated. In one embodiment, the second polyamide is PA66/6. In some embodiments, the second polyamide does not comprise PA66/6C.

The second polyamide is present in the polyamide composition in an amount ranging from 10 wt % to 50 wt %, e.g., 20 wt % to 40 wt %, 10 wt % to 30 wt %, or 10 wt % to 20 wt %. In terms of upper limits, the second polyamide can be present in amounts of less than 50 wt %, e.g., less than 40 wt %, less than 30 wt %, less than 20 wt %, or less than 15 wt %. In terms of lower limits, the second polyamide can be present in amounts of greater than 10 wt %, e.g., greater than 15 wt %, greater than 20 wt %, greater than 30 wt %, or greater than 40 wt %.

As noted above, the polyamide composition may also contain more than one second polyamide. For instance, the polyamide composition can also contain PA66 and/or PA6.

The additional second polyamide, or third polyamide, may be present in the polyamide composition in an amount ranging from 1 wt % to 10 wt %, e.g., 2 wt % to 8 wt %, 3 wt % to 7 wt %, or 4 wt % to 6 wt %. In terms of upper limits, the third polyamide can be present in amounts of less than 10 wt %, e.g., less than 7 wt %, less than 5 wt %, less than 2 wt %, or less than 1 wt %. In terms of lower limits, the third polyamide can be present in amounts of greater than 1 wt %, e.g., greater than 2 wt %, greater than 5 wt %, greater than 7 wt %, or greater than 8 wt %.

In addition to the first and second polyamides, the polyamide composition may contain other polyamides. The combination of polyamides in the compositions may comprise any number of known polyamides.

The polyamides in the polyamide composition may comprise a combination of polyamides. By combining various polyamides, the final composition may be able to incorporate the desirable properties, e.g., mechanical properties, of each constituent polyamides, including mechanical properties tested at elevated temperatures. In particular, the synergistic combination of PA66/6C and PA66/6 provides improved tensile strength retention, improved tensile strength at elevated temperatures, and better heat stability, especially when employed with the heat stabilizer packages.

Polyamide Composition Generally

The polyamide composition may comprise from 25 wt % to 99 wt % of (total) polymer, based on the total weight of the polyamide composition. In some cases, the polyamide composition may comprise amide polymer in an amount from 25 wt % to 99 wt %, from 25 wt % to 90 wt %, from 30 wt % to 85 wt %, from 50 wt % to 95 wt %, from 50 wt % to 90 wt %, from 50 wt % to 75 wt %, from 55 wt % to 70 wt %, from 57 wt % to 67 wt %, from 59 wt % to 65 wt %, from 70 wt % to 95 wt %, from 70 wt % to 90 wt %, and from 80 wt % to 95 wt %, or from 80 wt % to 90 wt %. In terms of upper limits, the polyamide composition may comprise amide polymer in an amount less than 99 wt %, e.g., less than 95 wt %, less than 90 wt %, less than 75 wt %, less than 70 wt %, less than 67 wt %, or less than 65 wt %. In terms of lower limits, the heat-stabilized polyamide composition may comprise amide polymer in an amount greater than 25 wt %, e.g. greater than 30 wt %, greater than 50 wt %, greater than 55 wt %, greater than 57 wt %, greater than 59 wt %, greater than 59 wt % greater than 70 wt %, greater than 80 wt %, greater than 85 wt %, or greater than 90 wt %.

Without being bound by theory, it is postulated that cycloaliphatic portion of the PA66, which may be present in the first, second, and/or third polyamide, provides unexpected heat age benefits. Other benefits from the cycloaliphatic portions of the polyamides include an increase in thermal properties, such as melt temperature, recrystallization temperature, etc. The improved thermal properties in turn provide the disclosed polyamide compositions with higher heat distortion temperatures (HDT) and improved stiffness properties at higher temperatures, especially when compared to conventional polyamide compositions, such as PA66.

In addition, the inventors have found that the use of particular (greater) quantities of low caprolactam content polyamides, e.g., PA-6,6/6C copolymer and PA-6,6/6 copolymer, e.g., greater than 75 wt %, (and thus lower amount of higher caprolactam content polyamides, e.g., PA-6) surprisingly provides for better heat stability over the aforementioned temperature ranges, especially when employed along with the synergistic heat stabilizer packages. The inventors have also found that the combination of particular low caprolactam content polyamides, e.g., PA-6,6/6C copolymer in combination with PA-6,6/6 copolymer, surprisingly provides for better heat stability over the aforementioned temperature ranges, especially when employed along with the synergistic heat stabilizer packages. Also, it has unexpectedly been found that the use of particular (greater) quantities of polyamides having low melt temperatures, e.g., below 210° C., (and thus lower amounts of higher melt temperature polyamides, e.g., PA-6) actually improves heat stability. Traditionally, it has been believed that the use of low caprolactam content polyamides and/or low melt temperature polyamides would be detrimental to the ultimate high temperature performance of the resultant polymer composition, e.g., since these low temperature polyamides have lower melt temperatures than high caprolactam content polyamides. The inventors have unexpectedly found that the addition of certain quantities of low caprolactam content polyamides and/or low melt temperature polyamides actually improves high temperature heat performance. Without being bound by theory, it is postulated that, at higher temperatures, these amide polymers actually "unzip" and shift toward the monomer phase, which surprisingly leads to the high heat performance improvements. Further, it is believed that the use of the polyamides having low melt temperatures actually provides for a reduction of the temperature at which the unzipping occurs, thus unexpectedly further contributing to improved thermal stability.

In some embodiments, as noted herein, low caprolactam content polyamides are utilized, e.g., a polyamide comprising more than 50 wt % non-caprolactam segments, more than 75 wt %, more than 90 wt %, or more than 95 wt %. In terms of ranges, the low caprolactam content polyamide may comprise from 50 wt % to 95 wt % low caprolactam content polyamides, e.g., from 60 wt % to 90 wt %, from 65 wt % to 85 wt %, or from 75 wt % to 80 wt %. In terms of lower limits, the low caprolactam content polyamide may comprise greater than 50 wt % low caprolactam content polyamides, e.g., greater than 60 wt %, greater than 70 wt %, greater than 80 wt %, or greater than 90 wt %. Examples of low caprolactam content polyamides include PA-66/6; PA-66/6C; PA-6; PA-66/6T; PA-6/66; PA-6T/6; PA-6,6/6I/6; PA-6I/6; or 6I/6I/6, or combinations thereof. These polyamides may contain some caprolactam, but it may be in low amounts.

In some embodiments, a low melt temperature polyamide is utilized, e.g., a polyamide having a melt temperature below 210° C., e.g., below 208° C., below 205° C., below 203° C., below 200° C., below 198° C., below 195° C., below 193° C., below 190° C., below 188° C., below 185° C., below 183° C., below 180° C., below 178° C., or below 175° C. Some polyamides may be low caprolactam content polyamides as well as low melt temperature polyamides, e.g., PA-66/6. In other cases, low melt temperature polyamides may not include some low caprolactam content polyamides, and vice versa.

In addition to the compositional make-up of the polyamide composition, it has also been discovered that the relative viscosity of the amide polymer in combination with the stabilizer package has been found to have many surprising benefits, both in performance and processing. For example, if the relative viscosity of the amide polymer is within certain ranges and/or limits, production rates and tensile strength (and optionally impact resilience) are improved.

Relative viscosity is not purely a function of polymer composition. Other factors such as polymerization time, the length of the polymer chain, the polymer architecture (linear or branched), and the solvent used in the measurements (for instance, how that solvent interacts with the polymer composition) also contribute to the relative viscosity of the polymer. Stated another way, the relative is not an inherent feature of the polymer segments.

In the polyamide compositions, the amide polymer may have a relative viscosity ranging from 3 to 100, e.g. from 10 to 80, from 20 to 75, from 30 to 60, from 35 to 55, from 40 to 50, or from 42 to 48. In terms of lower limits, the relative viscosity of the amide polymer may be greater than 3, e.g., greater than 10, greater than 20, greater than 30, greater than 35, greater than 36, greater than 40, or greater than 42. In terms of upper limits, the relative viscosity of the amide polymer may be less than 100, e.g., less than 80, less than 75, less than 60, less than 55, less than 50, or less than 48. Relative viscosity may be determined via the formic acid method, which is well-known in the industry.

In some cases, the polyamide composition (in some cases after or during heat aging) comprises low amounts of cyclopentanone, which improves degradation performance as noted above. In some embodiments, the heat-stabilized polyamide composition comprises from 1 ppm to 1 wt % (10,000 ppm) cyclopentanone, e.g., from 1 ppm to 5000 ppm, from 10 ppm to 4500 ppm, from 50 ppm to 4000 ppm, from 100 ppm to 4000 ppm, from 500 ppm to 4000 ppm, from 1000 ppm to 5000 ppm, from 2000 ppm to 4000 ppm, from 1500 ppm to 4500 ppm, from 1000 ppm to 3000 ppm, from 1500 ppm to 2500 ppm, or from 2500 ppm to 3500 ppm. In terms of lower limits, the heat-stabilized polyamide composition may comprise greater than 1 ppm cyclopentanone, e.g. greater than 10 ppm, greater than 50 ppm, greater than 100 ppm, greater than 250 ppm, greater than 400 ppm, greater than 500 ppm, greater than 1000 ppm, greater than 1500 ppm, greater than 2000 ppm, or greater than 2500 ppm. In terms of upper limits, the heat-stabilized polyamide composition may comprise less than 10,000 ppm cyclopentanone, e.g., less than 5000 ppm, less than 4500 ppm, less than 4000 ppm, less than 3500 ppm, less than 3000 ppm, less than 2500 ppm, less than 2000 ppm, less than 1500 ppm, or less than 1000 ppm.

Heat Stabilizer Packages

The heat stabilizer packages disclosed herein may synergistically improve the utility and functionality of polyamide compositions by mitigating, retarding, or preventing the effects damage, e.g., thermooxidative damage, that result from exposure of polyamides to heat. The heat stabilizer packages may vary widely and many polymer (polyamide) heat stabilizers are known and commercially available.

In some embodiments, the heat stabilizer package comprises a first heat stabilizer, e.g., a lanthanum-based compound and/or a second heat stabilizer. In some cases, the amount of the first heat stabilizer is present in an amount greater than the second heat stabilizer.

Lanthanum Compounds

The first heat stabilizer may vary widely. Generally, the first heat stabilizer is a compound that comprises a lanthanum. In some cases, the lanthanum-based heat stabilizer may have an oxidation number of +III or +IV.

In some cases, the first heat stabilizer is generally of the structure $(L)X_n$, where X is a ligand and n is a non-zero integer, and L is lanthanum. That is to say, in some embodiments, the lanthanum-based heat stabilizer is a lanthanum-based ligand. The inventors have found that particular lanthanum ligands are able to stabilize polyamides particularly well, especially when utilized in the aforementioned amounts, limits, and/or ratios. In some embodiments, the ligand(s) may be selected from the group consisting of acetates, hydrates, oxyhydrates, phosphates, bromides, chlorides, oxides, nitrides, borides, carbides, carbonates, ammonium nitrates, fluorides, nitrates, polyols, amines, phenolics, hydroxides (such as lanthanum hydroxide), oxalates, oxyhalides, chromoates, sulfates, or aluminates, perchlorates, the monochalcogenides of sulphur, selenium and tellurium, carbonates, hydroxides, oxides, trifluoromethanesulphonates, acetylacetonates, alcoholates, 2-ethylhexanoates, or combinations thereof. Hydrates of these are contemplated as well.

In some embodiments, the lanthanum-based compound is lanthanum oxide, lanthanum oxyhydrate, or combinations thereof. Lanthanum hydrate is also an option. In some embodiments, the heat-stabilized polyamide compositions comprise multiple lanthanum-based heat stabilizers. For example, the heat-stabilized polyamide composition may comprise both lanthanum oxide, lanthanum (tri)hydroxide (hydrate), lanthanum oxyhydrate and/or lanthanum acetate.

In some embodiments, the polyamide composition comprises the first heat stabilizer, e.g., the lanthanum-based compound, e.g., lanthanum oxide, lanthanum hydroxide, and/or lanthanum oxyhydrate, in an amount ranging from 0.01 wt % to 10.0 wt %, e.g., from 0.01 wt % to 8.0 wt %, from 0.01 wt % to 7.0 wt %, from 0.02 wt % to 5.0 wt %, from 0.03 to 4.5 wt %, from 0.05 wt % to 4.5 wt %, from 0.07 wt % to 4.0 wt %, from 0.07 wt % to 3.0 wt %, from 0.1 wt % to 3.0 wt %, from 0.1 wt % to 2.0 wt %, from 0.2 wt % to 1.5 wt %, from 0.1 wt % to 1.0 wt %, or from 0.3 wt % to 1.2 wt %. In terms of lower limits, the polyamide composition may comprise greater than 0.01 wt % first heat stabilizer, e.g., greater than 0.02 wt %, greater than 0.03 wt %, greater than 0.05 wt %, greater than 0.07 wt %, greater than 0.1 wt %, greater than 0.2 wt %, or greater than 0.3 wt %. In terms of upper limits, the polyamide composition may comprise less than 10.0 wt % first heat stabilizer, e.g., less than 8.0 wt %, less than 7.0 wt %, less than 5.0 wt %, less than 4.5 wt %, less than 4.0 wt %, less than 3.0 wt %, less than 2.0 wt %, less than 1.5 wt %, less than 1.2 wt %, less than 1.0 wt %, or less than 0.7 wt %.

In some cases, the polyamide composition comprises little or no cerium hydrate, e.g., less than 10.0 wt % cerium hydrate, e.g., less than 8.0 wt %, less than 7.0 wt %, less than 5.0 wt %, less than 4.5 wt %, less than 4.0 wt %, less than 3.0 wt %, less than 2.0 wt %, less than 1.5 wt %, less than 1.2 wt %, less than 1.0 wt %, less than 0.7 wt %, less than 0.5 wt %, less than 0.3 wt %, or less than 0.1 wt %. In some cases, the polyamide composition comprises substantially no cerium hydrate, e.g., no cerium hydrate.

In some embodiments, the polyamide composition comprises lanthanum hydroxide, lanthanum oxide, or lanthanum oxyhydrate, or a combination of two or more of lanthanum hydroxide, lanthanum oxide and lanthanum oxyhydrate, in an amount ranging from 10 ppm to 1 wt %, e.g., from 10 ppm to 9000 ppm, from 20 ppm to 8000 ppm, from 50 ppm to 7500 ppm, from 500 ppm to 7500 ppm, from 1000 ppm to 7500 ppm, from 2000 ppm to 8000 ppm, from 1000 ppm to 9000 ppm, from 1000 ppm to 8000 ppm, from 2000 ppm to 8000 ppm, from 2000 ppm to 7000 ppm, from 2000 ppm to 6000 ppm, from 2500 ppm to 7500 ppm, from 3000 ppm to 7000 ppm, from 3500 ppm to 6500 ppm, from 4000 ppm to 6000 ppm, or from 4500 ppm to 5500 ppm.

In terms of lower limits, the polyamide composition may comprise greater than 10 ppm lanthanum hydroxide, lanthanum oxide, or lanthanum oxyhydrate, or a combination thereof, e.g., greater than 20 ppm, greater than 50 ppm, greater than 100 ppm, greater than 200 ppm, greater than 500 ppm, greater than 1000 ppm, greater than 2000 ppm, greater than 2500 ppm, greater than 3000 ppm, greater than 3200 ppm, greater than 3300 ppm, greater than 3500 ppm, greater than 4000 ppm, or greater than 4500 ppm. In terms of upper limits, the polyamide composition may comprise less than 1 wt % lanthanum hydroxide, lanthanum oxide, or lanthanum oxyhydrate, or a combination thereof, e.g., less than 9000 ppm, less than 8000 ppm, less than 7500, less than 7000 ppm, less than 6500 ppm, less than 6000 ppm, or less than 5500 ppm.

The inventors have surprisingly found that the use of the lanthanum-based stabilizer in the amounts discussed herein has a synergistic effect with particular polyamide components, such as PA66/6C. Without being bound by theory, it is believed that the lanthanum-based heat stabilizer unexpectedly provide for thermooxidative stabilization at particularly useful ranges, e.g., 190° C. to 220° C. or 190° C. to 210° C. By utilizing the lanthanum-based compound with the PA66/6C in the amounts discussed herein, thermal stabilization in the polyamide composition is unexpectedly achieved.

Second Heat Stabilizer

The second heat stabilizer may vary widely. In some embodiments, the second heat stabilizer comprises a copper-based stabilizer. By way of non-limiting example, the copper-based compound of the second heat stabilizer may comprise compounds of mono- or bivalent copper, such as salts of mono- or bivalent copper with inorganic or organic acids or with mono- or bivalent phenols, the oxides of mono- or bivalent copper, or complex compounds of copper salts with ammonia, amines, amides, lactams, cyanides or phosphines, and combinations thereof. In some preferred embodiments, the copper-based compound may comprise salts of mono- or bivalent copper with hydrohalogen acids, hydrocyanic acids, or aliphatic carboxylic acids, such as copper(I) chloride, copper(I) bromide, copper(I) iodide, copper(I) cyanide, copper(II) oxide, copper(II) chloride, copper(II) sulfate, copper(II) acetate, or copper (II) phosphate. Preferably, the copper-based compound is copper iodide and/or copper bromide. The second heat stabilizer may be employed with a halide additive discussed below. Copper stearate, as a second heat stabilizer (not as a stearate additive) is also contemplated.

In some embodiments, the second heat stabilizer may be selected from the group consisting of phenolics, amines, polyols, and combinations thereof. For example, the heat stabilizer package may comprise amine stabilizers, e.g., secondary aromatic amines. Examples include adducts of phenylene diamine with acetone (Naugard A), adducts of phenylene diamine with linolene, Naugard 445, N,N'-dinaphthyl-p-phenylene diamine, N-phenyl-N'-cyclohexyl-p-phenylene diamine, N,N'-diphenyl-p-phenylene diamine or mixtures of two or more thereof.

Other examples include heat stabilizers based on sterically hindered phenols. Examples include N,N'-hexamethylene-bis-3-(3,5-di-tert-butyl-4-hydroxyphenyl)-propionamide, bis-(3,3-bis-(4'-hydroxy-3'-tert-butylphenyl)-butanoic acid)-glycol ester, 2,1'-thioethylbis-(3-(3,5-di-tert-butyl-4-hydroxyphenyl)-propionate, 4-4'-butylidene-bis-(3-methyl-6-tert-butylphenol), triethyleneglycol-3-(3-tert-butyl-4-hydroxy-5-methylphenyl)-propionate or mixtures these stabilizers.

Further examples include phosphites and/or phosphonites. Specific examples include phosphites and phosphonites are triphenylphosphite, diphenylalkylphosphite, phenyldialkylphosphite, tris(nonylphenyl)phosphite, trilaurylphosphite, trioctadecylphosphite, distearylpentaerythritoldiphosphite, tris(2,4-di-tert-butylphenyl)phosphite, diisodecylpentaerythritoldiphosphite, bis(2,4-di-tert-butylphenyl) pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris-(tert-butylphenyl)pentaerythritoldiphosphite, tristearylsorbitoltriphosphite, tetrakis(2,4-di-tert-butylphenyl)-4,4'-biphenylenediphosphonite, 6-isooctyloxy-2,4,8,10-tetra-tert-butyl-12H-dibenzo-[4d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl)methylphosphite and bis(2,4-di-tert-butyl-6-methylphenyl)ethylphosphite. Particularly preferred are tris[2-tert-butyl-4-thio(2'-methyl-4'-hydroxy-5'-tert-butyl)-phenyl-5-methyl] phenylphosphite and tris(2,4-di-tert-butylphenyl)phosphite (Hostanox® PAR24: commercial product of the company Clariant, Basel).

In some embodiments, the polyamide composition comprises the second heat stabilizer in an amount ranging from 0.01 wt % to 5.0 wt %, e.g., from 0.01 wt % to 4.0 wt %, from 0.02 wt % to 3.0 wt %, from 0.03 to 2.0 wt %, from 0.03 wt % to 1.0 wt %, from 0.04 wt % to 1.0 wt %, from 0.05 wt % to 0.5 wt %, from 0.05 wt % to 0.2 wt %, from 0.07 wt % to 0.1 wt %, from 0.1 wt % to 5.0 wt %, from 0.1 wt % to 1.0 wt %, from 1.0 wt % to 5.0 wt %, or from 2.0 wt % to 5.0 wt %. In terms of lower limits, the polyamide composition may comprise greater than 0.01 wt % second heat stabilizer, e.g., greater than 0.02 wt %, greater than 0.03 wt %, greater than 0.035 wt %, greater than 0.04 wt %, greater than 0.05 wt %, greater than 0.07 wt %, or greater than 0.1 wt %. In terms of upper limits, the polyamide composition may comprise less than 5.0 wt % second heat stabilizer, e.g., less than 4.0 wt %, less than 3.0 wt %, less than 2.0 wt %, less than 1.0 wt %, less than 0.5 wt %, less than 0.2 wt %, less than 0.1 wt %, less than 0.05 wt %, or less than 0.035 wt %.

In some embodiments, polyamide composition comprises the second heat stabilizer, e.g., copper-based compound, in an amount ranging from 1 ppm to 1500 ppm, e.g., from 10 ppm to 1200 ppm, from 50 ppm to 1000 ppm, from 50 ppm to 800 ppm, from 100 ppm to 750 ppm, from 200 ppm to 700 ppm, from 300 ppm to 600 ppm, or from 350 ppm to 550 ppm. In terms of lower limits, the polyamide composition comprises the second heat stabilizer in an amount greater than 1 ppm, e.g., greater than 10 ppm, greater than 50 ppm, greater than 100 ppm, greater than 200 ppm, greater than 300 ppm, or greater than 350 ppm. In terms of upper limits, the polyamide composition comprises the second heat stabilizer in an amount less than 1500 ppm, e.g., less than 1200 ppm, less than 1000 ppm, less than 800 ppm, less than 750 ppm, less than 700 ppm, less than 600 ppm, or less than 550 ppm.

In cases where the second heat stabilizer is a copper-based compound, the copper-based compound may be present in the heat stabilizer package (and in the polyamide composition) in the amounts discussed herein with respect to the second heat stabilizer generally.

The inventors have found that particular second heat stabilizers unexpectedly provide for synergistic results, especially when utilized in the aforementioned amounts, limits, and/or ratios and with the lanthanum-based stabilizer, stearate additive, and halide additive. More particularly, the inventors have surprisingly found that the use of the copper-based stabilizer and the lanthanum-based stabilizer in the amounts discussed herein has a synergistic effect. Without being bound by theory, it is believed that the combination of the activation temperatures of the lanthanum-based heat stabilizer and the copper-based stabilizer unexpectedly provide for thermooxidative stabilization at particularly useful ranges, e.g., 190° C. to 220° C., 200° C. to 220° C., or 190° C. to 210° C. This particular range has been shown to present a performance gap when conventional stabilizer packages are employed. By utilizing the combination of the copper-based compound and the lanthanum-based compound in the amounts discussed herein, thermal stabilization is unexpectedly achieved.

The weight ratio of the lanthanum-based heat stabilizer to the second heat stabilizer, e.g., a copper-based heat stabilizer, may be referred to herein as the "lanthanum ratio."

As noted above, the lanthanum ratio has unexpectedly been found to greatly affect the overall heat stability of the resultant polyamide composition. In some embodiments, the lanthanum ratio is less than 8.5, e.g., less than 8.0, less than 7.5, less than 7.0, less than 6.5, less than 6.0, less than 5.5, less than 5.0, less than 4.5, less than 4.0, less than 3.5, less than 3.0, less than 3.5, less than 3.0, less than 2.5, less than 2.0, less than 1.5, less than 1.0, or less than 0.5. In terms of ranges, the lanthanum ratio may range from 0.1 to 8.5, e.g., from 0.2 to 8.0; from 0.3 to 8.0, from 0.4 to 7.0, from 0.5 to 6.5, from 0.5 to 6, from 0.7 to 5.0, from 1.0 to 4.0, from 1.2 to 3.0, from 1.5 to 2.5, or from 1.0 to 5.0. In terms of lower limits, the lanthanum ratio may be greater than 0.1, e.g., greater than 0.2, greater than 0.3, greater than 0.5, greater than 0.5, greater than 0.7, greater than 1.0, greater than 1.2, greater than 1.5, greater than 2.0, greater than 3.0, or greater than 4.0.

In some embodiments, the lanthanum ratio is greater than 14.5, e.g., greater than 15.0, greater than 16.0, greater than 18.0, greater than 20.0, greater than 25.0, greater than 30.0, or greater than 35.0. In terms of ranges, the lanthanum ratio may range from 14.5 to 50.0, e.g., from 14.5 to 40.0; from 15.0 to 35.0, from 16.0 to 30.0, from 18.0 to 30.0, from 18.0 to 25.0, or from 18.0 to 23.0. In terms of upper limits, the lanthanum ratio may be less than 50.0, e.g., less than 40.0, less than 35.0, less than 30.0, less than 25.0, or less than 23.0.

In some embodiments, the lanthanum ratio is greater than 5, e.g., greater than 6.0, greater than 7.0, greater than 8.0, or greater than 9.0. In terms of ranges, the lanthanum ratio may range from 5.0 to 50.0, e.g., from 5 to 40.0; from 5.0 to 30.0, from 5.0 to 20.0, from 5.0 to 15.0, from 7.0 to 15.0, or from 8.0 to 13.0. In terms of upper limits, the lanthanum ratio may be less than 50.0, e.g., less than 40.0, less than 30.0, less than 20.0, less than 15.0, or less than 13.0.

As noted herein, the synergistic combination of the specific polyamides and the heat stabilizers is believed to advantageously form an amine/metal complex, which surprisingly contributes to improvements in high temperature performance. In some embodiments, due to the specific levels of polyamides and the particular lanthanum compounds, the heat-stabilized polyamide composition comprises an amine/metal complex. In some cases, the heat-stabilized polyamide composition comprises from 1 ppm to 1 wt % (10,000 ppm) amine/metal complex, e.g., from 1 ppm to 5000 ppm, from 10 ppm to 4500 ppm, from 50 ppm to 4000 ppm, from 100 ppm to 4000 ppm, from 500 ppm to 4000 ppm, from 1000 ppm to 5000 ppm, from 2000 ppm to 4000 ppm, from 1500 ppm to 4500 ppm, from 1000 ppm to 3000 ppm, from 1500 ppm to 2500 ppm, or from 2500 ppm to 3500 ppm. In terms of lower limits, the heat-stabilized polyamide composition may comprise greater than 1 ppm amine/metal complex, e.g. greater than 10 ppm, greater than 50 ppm, greater than 100 ppm, greater than 250 ppm, greater than 400 ppm, greater than 500 ppm, greater than 1000 ppm, greater than 1500 ppm, greater than 2000 ppm, or greater than 2500 ppm. In terms of upper limits, the heat-stabilized polyamide composition may comprise less than 10,000 ppm amine/metal complex, e.g., less than 5000 ppm, less than 4500 ppm, less than 4000 ppm, less than 3500 ppm, less than 3000 ppm, less than 2500 ppm, less than 2000 ppm, less than 1500 ppm, or less than 1000 ppm. In some cases, the amine/metal complex is an amine/lanthanum complex, e.g., an amine/copper complex; or an amine/lanthanum/copper complex, or combinations thereof. The ranges and limits mentioned herein are applicable to these specific complexes as well.

The polyamide may further comprise (in addition to the first and second heat stabilizers) a halide additive, e.g., a chloride, a bromide, and/or an iodide. In some cases, the purpose of the halide additive is to improve the stabilization of the polyamide composition. Surprisingly, the inventors have discovered that, when employed as described herein, the halide additive works synergistically with the stabilizer package by mitigating free radical oxidation of polyamides. Exemplary halide additives include potassium chloride, potassium bromide, and potassium iodide. In some cases, these additives are utilized in amounts discussed herein.

The halide additive may vary widely. In some cases, the halide additive may be utilized with the second heat stabilizer. In some cases, the halide additive is not the same component as the second heat stabilizer, e.g., the second heat stabilizer, copper halide, is not considered a halide additive. Halide additive are generally known and are commercially available. Exemplary halide additives include iodides and bromides. Preferably, the halide additive comprises a chloride, an iodide, and/or a bromide.

In some embodiments, the halide additive is present in the polyamide composition in an amount ranging from 0.001 wt % to 1 wt %, e.g., from 0.01 wt % to 0.75 wt %, from 0.01 wt % to 0.75 wt %, from 0.05 wt % to 0.75 wt %, from 0.05 wt % to 0.5 wt %, from 0.075 wt % to 0.75 wt %, or from 0.1 wt % to 0.5 wt %. In terms of upper limits, the halide additive may be present in an amount less than 1 wt %, e.g., less than 0.75 wt %, or less than 0.5 wt %. In terms of lower limits, the halide additive may be present in an amount greater than 0.001 wt %, e.g., greater than 0.01 wt %, greater than 0.05 wt %, greater than 0.075 wt %, or greater than 0.1 wt %.

In some embodiments, halide, e.g., iodide, is present in an amount ranging from 30 wppm to 5000 wppm, e.g., from 30 wppm to 3000 wppm, from 50 wppm to 2000 wppm, from 50 wppm to 1000 wppm, from 75 wppm to 750 wppm, from 100 wppm to 500 wppm, from 150 wppm to 450 wppm, or from 200 wppm to 400 wppm. In terms of lower limits, the halide may be present in an amount at least 30 wppm, e.g., at least 50 wppm, at least 75 wppm, at least 100 wppm, at least 150 wppm, or at least 200 wppm. In terms of upper limits, the halide may be present in an amount less than 5000 wppm, e.g., less than 3500 wppm, less than 3000 wppm, less than 2000 wppm, less than 1000 wppm, less than 750 wppm, less than 500 wppm, less than 450 wppm, or less than 400 wppm.

Total halide, e.g., iodide, content in some cases includes iodide from all sources, e.g., first and second heat stabilizers, e.g., copper iodide, and additives, e.g., potassium iodide.

In some cases, the weight ratio of lanthanum to halide, e.g., iodide, has been shown to demonstrate unexpected heat performance. Without being bound by theory, it is postulated that halide is important to the regeneration of the lanthanum compounds, possibly providing the ability of some lanthanum ions to return to the original state, which leads to improved and more consistent heat performance over time. In some cases, when lanthanum oxide and/or lanthanum oxyhydrate are employed, particular (higher) amounts of halide, e.g., iodide, are used in conjunction therewith. Beneficially, when these amounts of iodide and lanthanum-based heat stabilizer and/or weight ratios thereof are employed, the use of bromine-containing components can advantageously be eliminated. In addition, iodide ion may play a role in stabilizing higher oxidation states of cerium which could further contribute to the heat stability of lanthanum oxide/oxyhydrate system.

In some cases, the ratio of the weight ratio of the first heat stabilizer, e.g., lanthanum-based compound, to the halide is less than 0.175, e.g., less than 0.15, less than 0.12, less than 0.1, less than 0.075, less than 0.05, or less than 0.03. In terms of ranges, the weight ratio of the lanthanum-based compound to the halide may range from 0.001 to 0.174, e.g., from 0.001 to 0.15, from 0.005 to 0.12, from 0.01 to 0.1, or from 0.5 to 0.5. In terms of lower limits, the weight ratio of the lanthanum-based compound to the halide is at least 0.001, e.g., at least 0.005, at least 0.01, or at least 0.5.

In some cases, the ratio of the weight ratio of the first heat stabilizer, e.g., lanthanum-based compound, to the halide additive is less than 25, e.g., less than 20, less than 18, or less than 17.5. In terms of ranges, the weight ratio of the lanthanum-based compound to the halide may range from 0.1 to 25, e.g., from 0.5 to 20, from 0.5 to 18, from 5 to 20, or from 10 to 17.5. In terms of lower limits, the weight ratio of the lanthanum-based compound to the halide is at least 0.1, e.g., at least 0.5, at least 1, or at least 10.

In some cases, the ratio of the weight ratio of the second heat stabilizer, e.g., copper-based compound, to the halide additive is less than 0.175, e.g., less than 0.15, less than 0.12, less than 0.1, less than 0.075, less than 0.05, or less than 0.03. In terms of ranges, the weight ratio of the lanthanum-based compound to the halide may range from 0.001 to 0.174, e.g., from 0.001 to 0.15, from 0.005 to 0.12, from 0.01 to 0.1, or from 0.5 to 0.5. In terms of lower limits, the weight ratio of the lanthanum-based compound to the halide is at least 0.001, e.g., at least 0.005, at least 0.01, or at least 0.5.

In preferred embodiments, the heat-stabilized polyamide preferably may comprise the stearate additives, e.g., calcium stearates, but in small amounts, if any. Generally, stearates are not known to contribute to stabilization; rather, stearate additives are typically used for lubrication and/or to aid in mold release. Because synergistic small amounts are employed, the disclosed heat-stabilized polyamide compositions are able to effectively produce polyamide structures without requiring high amounts of stearate lubricants typically present in conventional polyamides, thus providing production efficiencies. Also, the inventors have found that the small amounts of stearate additive reduces the potential for formation of detrimental stearate degradation products. In particular, the stearate additives have been found to degrade at higher temperatures, giving rise to further stability problems in the polyamide compositions.

In some cases, the polyamide composition beneficially comprises little or no stearates, e.g., calcium stearate or zinc stearate. In some cases the weight ratio of the halide additive to the stearate additive and/or the weight ratio of the second heat stabilizer to the halide additive are maintained within certain ranges and/or limits.

The stearate additive may be present in synergistic small amounts. For example, the polyamide composition may comprise less than 0.3 wt % stearate additive, e.g., less than 0.25 wt %, less than 0.2 wt %, less than 0.15 wt %, less than 0.10 wt %, less than 0.05 wt %, less than 0.03 wt %, less than 0.01 wt %, or less than 0.005 wt %. In terms of ranges, the polyamide composition may comprise from 1 wppm to 0.3 wt % stearate additive, e.g., from 1 wppm to 0.25 wt %, from 5 wppm to 0.1 wt %, from 5 wppm to 0.05 wt %, or from 10 wppm to 0.005 wt %. In terms of lower limits, the polyamide composition may comprise greater than 1 wppm stearate additive, e.g., greater than 5 wppm, greater 10 wppm, or greater than 25 wppm. In some embodiments, the polyamide composition comprises substantially no stearate additive, e.g., comprises no stearate additive.

The inventors have also discovered that when the weight ratio of the halide additive to the stearate additive is maintained within certain ranges and/or limits, the stabilization is synergistically improved. In some embodiments, the weight ratio of halide additive, e.g., bromide or iodide, to stearate additive, e.g., calcium stearate or zinc stearate is less than 45.0, e.g., less than 40.0, less than 35.0, less than 30.0, less than 25.0, less than 20.0, less than 15.0, less than 10.0, less than 5.0, less than 4.1, less than 4.0, or less than 3.0. In terms of ranges, this weight ratio may range from 0.1 to 45, e.g., from 0.1 to 35, from 0.5 to 25, from 0.5 to 20.0, from 1.0 to 15.0, from 1.0 to 10.0, from 1.5 to 8, from 1.5 to 6.0, from 2.0 to 6.0, or from 2.5 to 5.5. In terms of lower limits, this ratio may be greater than 0.1, e.g., greater than 0.5, greater than 1.0, greater than 1.5, greater than 2.0, greater than 2.5, greater than 5.0, or greater than 10.0.

In some embodiments, the halide additive is present in the polyamide composition in an amount ranging from 0.001 wt % to 1 wt %, e.g., from 0.01 wt % to 0.75 wt %, from 0.01 wt % to 0.75 wt %, from 0.05 wt % to 0.75 wt %, from 0.05 wt % to 0.5 wt %, from 0.075 wt % to 0.75 wt %, or from 0.1 wt % to 0.5 wt %. In terms of upper limits, the halide additive may be present in an amount less than 1 wt %, e.g., less than 0.75 wt %, or less than 0.5 wt %. In terms of lower limits, the halide additive may be present in an amount greater than 0.001 wt %, e.g., greater than 0.01 wt %, greater than 0.05 wt %, greater than 0.075 wt %, or greater than 0.1 wt %.

In some cases, the polyamide composition comprises little or no antioxidant additives, e.g., phenolic antioxidants. As noted above, antioxidants are known polyamide stabilizers that are unnecessary in the polyamide compositions of the present disclosure. Preferably, the polyamide composition comprises no antioxidants. As a result, there is advantageously little need for antioxidant additives, and production efficiencies are achieved. For example, the polyamide composition may comprise less than 5 wt % antioxidant additive, e.g., less than 4.5 wt %, less than 4.0 wt %, less than 3.5 wt %, less than 3.0 wt %, less than 2.5 wt %, less than 2.0 wt %, less than 1.5 wt %, less than 1.0 wt %, less than 0.5 wt %, or less than 0.1 wt %. In terms of ranges, the polyamide composition may comprise from 0.0001 wt % to 5 wt % antioxidants, e.g., from 0.001 wt % to 4 wt %, from 0.01 wt % to 3 wt %, from 0.01 wt % to 2 wt %, from 0.01 wt % to 1 wt %, from 0.01 wt % to 0.5 wt %, or from 0.05 wt % to 0.5 wt %. In terms of lower limits, the polyamide composition may comprise greater than 0.0001 wt % antioxidant additive, e.g., greater than 0.001 wt %, greater than 0.01 wt %, greater than 0.05, or greater than 0.1 wt %.

It has been discovered that when preparing the heat-stabilized polyamide compositions disclosed herein, the lanthanum-based compound can beneficially be selected on the basis of that activation temperature. It has also been discovered that the lanthanum-based compound's ability to stabilize may not fully activate at lower temperatures. In some cases. the lanthanum-based compound may have an activation temperature greater than 180° C. e.g., greater than 183° C., greater than 185° C., greater than 187° C., greater than 190° C., greater than 192° C., greater than 195° C., greater than 197° C., greater than 200° C., greater than 202° C., greater than 205° C., greater than 207° C., greater than 210° C., greater than 212° C., or greater than 215° C. In terms of ranges, the lanthanum-based compound may have an activation temperature ranging from 180° C. to 230° C., e.g., from 180° C. to 220° C., from 185° C. to 230° C., from 185° C. to 220° C., from 190° C. to 220° C., from 190° C. to 210° C., from 195° C. to 205° C., or from 200° C. to 205° C. In terms of upper limits, the lanthanum-based compound may have an activation temperature less than 230° C. e.g., less than 220° C., less than 210° C., or less than 205° C. In preferred embodiments, the lanthanum-based compound has an activation temperature of approximately 230° C.

The activation temperature of a polyamide heat stabilizer may be an "effective activation temperature." The effective activation temperature relates to the temperature at which the stabilization functionality of the additive becomes more active than the thermo-oxidative degradation of the poly- amide composition. The effective activation temperature reflects a balance between the stabilization kinetics and the degradation kinetics.

In some cases, when a heat stabilization target is known, the lanthanum-based compound, or the combination of lanthanum-based heat compounds, can be selected based on the heat stabilization target. For example, in some embodi- ments, the lanthanum-based compound is preferably selected such that the lanthanum-based compound has an activation temperature falling within the ranges and limits mentioned herein.

In some embodiments, the second heat stabilizer may have an activation temperature less than 200° C. e.g., less than 190° C., less than 180° C., less than 170° C., less than 160° C., less than 150° C., or less than 148° C. In terms of lower limits, the second heat stabilizer may have an activa- tion temperature greater than 100° C. e.g., greater than 110° C., greater than 120° C., greater than 130° C., greater than 140° C., or greater than 142° C. In terms of ranges, the second heat stabilizer may have an activation temperature ranging from 100° C. to 200° C., e.g., from 120° C. to 160° C., from 110° C. to 190° C., from 110° C. to 180° C., from 120° C. to 170° C., from 130° C. to 160° C., from 140° C. to 150° C., or from 142° C. to 148° C. Effective activation temperatures may be within these ranges and limits as well.

In preferred embodiments, the second heat stabilizer is selected such that it has an activation temperature lower than the activation temperature of the lanthanum-based com- pound. By utilizing a second heat stabilizer with a lower activation temperature than that of the lanthanum-based compound, the resultant polyamide composition may show increased heat stability and/or heat stability over a broader range of temperatures. In some embodiments, the activation temperature of the lanthanum-based compound is greater than the activation temperature of the second heat stabilizer, e.g., the copper-based compound, e.g., at least 10% greater, at least 12% greater, at least 15% greater, at least 17% greater, at least 20% greater, at least 25% greater, at least 30% greater, at least 40% greater, or at least 50% greater.

As noted above, some conventional stabilizer packages may rely on combinations of second heat stabilizers, e.g., stearates (such as calcium stearate or zinc stearate), hypophosphoric acids, and/or hypophosphates. It has been discovered that the use of the aforementioned cerium-based heat stabilizer and lower amounts, if any, of these com- pounds has been surprisingly found to improve the stabili- zation profile of the resultant polyamide composition. In some embodiments, the polyamide composition comprises less than 0.5 wt % of hypophosphoric acid and/or a hypophosphate, e.g., less than 0.3 wt %, less than 0.1 wt %, less than 0.05 wt %, or less than 0.01 wt %. In terms of ranges, the polyamide composition may comprise from 1 wppm to 0.5 wt % of hypophosphoric acid and/or a hypophosphate, e.g., from 1 wppm to 0.3 wt %, from 1 wppm to 0.1 wt %, from 5 wppm to 0.05 wt %, or from 5 wppm to 0.01 wt %. In a preferred embodiment, the poly- amide composition comprises no hypophosphoric acid and/ or a hypophosphate.

Some embodiments of the heat-stabilized polyamide compositions comprise a filler, e.g., glass. In these cases, the filler may be present in an amount ranging from 20 wt % to 60 wt %, e.g., from 25 wt % to 55 wt %, or from 30 wt % to 50 wt %. In terms of lower limits, the polyamide com- positions may comprise at least 20 wt % filler, e.g., at least 25 wt %, at least 30 wt %, at least 35 wt %, or at least 40 wt %. In terms of upper limits, the polyamide compositions may comprise less than 60 wt % filler, e.g., less than 55 wt %, less than 50 wt %, less than 45 wt %, or less than 40 wt %. The ranges and limits for the other components disclosed herein are based on a "filled" composition. For a neat composition, the ranges and limits may need to be adjusted to compensate for the lack of filler. As one example, a neat composition may comprise from 57 wt % to 98 wt % amide polymer, e.g., from 67 wt % to 87 wt %; from 0.1 wt % to 10 wt % nigrosine, e.g., from 0.5 to 5 wt %; from 5 wt % to 40 wt % additional polyamide, e.g., from 5 wt % to 30 wt %; from 0.1 wt % to 10 wt % carbon black, e.g., from 0.1 wt % to 5 wt %; from 0.05 wt % to 10 wt % first stabilizer, e.g., from 0.05 to 5 wt %; and from 0.05 wt % to 10 wt % second stabilizer, e.g., from 0.05 wt % to 5 wt %.

The material of the filler is not particularly limited and may be selected from polyamide fillers known in the art. By way of non-limiting example, the filler may comprise glass- and/or carbon fibers, particulate fillers, such as mineral fillers based on natural and/or synthetic layer silicates, talc, mica, silicate, quartz, titanium dioxide, wollastonite, kaolin, amorphous silicic acids, magnesium carbonate, magnesium hydroxide, chalk, lime, feldspar, barium sulphate, solid or hollow glass balls or ground glass, permanently magnetic or magnetisable metal compounds and/or alloys and/or com- binations thereof, and also combinations thereof.

In other cases, the heat-stabilized polyamide composi- tions is a "neat" composition, e.g., the polyamide composi- tion comprises little or no filler. For example the polyamide compositions may comprise less than 65 wt % filler, e.g., less than 50 wt %, less than 25 wt %, less than 10 wt %, or less than 5 wt %. In terms of ranges, the polyamide com- positions may comprise from 0 wt % to 65 wt % filler, e.g., from 0.1 wt % to 50 wt %, from 10 wt % to 50 wt %, or from 25 wt % to 50 wt %. In such cases, the amounts of other components may be adjusted accordingly based on the aforementioned component ranges and limits. It is contem- plated that a person of ordinary skill in the art would be able to adjust the concentration of the other components of the polyamide composition in light of the inclusion or exclusion of a glass filler.

Color Package

The polyamide composition may comprise a color pack- age containing colorants known to those of skill in the art to be compatible with polyamide compositions. Suitable components in the color package include colorants, carbon black, nigrosine, and combinations thereof. Colorants that may be used with the polyamide composition are disclosed in US Patent Application No. 2021/0277203, herein incorporated by reference in its entirety.

The concentration of the nigrosine in the polyamide composition can, for example, range from 0 to 5 wt %, e.g., from 0.1 wt % to 1 wt %, from 0.15 wt % to 1.5 wt %, from 0.22 wt % to 2.3 wt %, from 0.32 wt % to 3.4 wt %, or from 0.48 wt % to 5 wt %. In some embodiments, the concentration of the nigrosine ranges from 1 wt % to 2 wt %, e.g., from 1 wt % to 1.6 wt %, from 1.1 wt % to 1.7 wt %, from 1.2 wt % to 1.8 wt %, from 1.3 wt % to 1.9 wt %, or from 1.4 wt % to 2 wt %. In terms of upper limits, the nigrosine concentration can be less than 5 wt %, e.g., less than 3.4 wt %, less than 2.3 wt %, less than 2 wt %, less than 1.9 wt %, less than 1.8 wt %, less than 1.7 wt %, less than 1.6 wt %, less than 1.5 wt %, less than 1.4 wt %, less than 1.3 wt %, less than 1.2 wt %, less than 1.1 wt %, less than 1 wt %, less than 0.71 wt %, less than 0.48 wt %, less than 0.32 wt %, less than 0.22 wt %, or less than 0.15 wt %. In terms of lower limits, the nigrosine concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.1 wt %, greater than 1.2 wt %, greater than 1.3 wt %, greater than 1.4 wt %, greater than 1.5 wt %, greater than 1.6 wt %, greater than 1.7 wt %, greater than 1.8 wt %, greater than 1.9 wt %, greater than 2 wt %, greater than 2.3 wt %, or greater than 3.4 wt %. Lower concentrations, e.g., less than 0.1 wt %, and higher concentrations, e.g., greater than 5 wt %, are also contemplated. In some cases, the nigrosine is provided in a masterbatch, and the concentration of the nigrosine in the masterbatch and in the resultant composition can be easily calculated.

The concentration of the carbon black in the polyamide composition can, for example, range from 0 to 5 wt %, e.g., from 0.1 wt % to 1.05 wt %, from 0.15 wt % to 1.55 wt %, from 0.22 wt % to 2.29 wt %, from 0.32 wt % to 3.38 wt %, or from 0.48 wt % to 5 wt %. In some embodiments, the concentration of the carbon black ranges from 0.2 wt % to 0.8 wt %. In terms of upper limits, the carbon black concentration can be less than 5 wt %, e.g., less than 3.4 wt %, less than 2.3 wt %, less than 1.5 wt %, less than 1 wt %, less than 0.71 wt %, less than 0.48 wt %, less than 0.32 wt %, less than 0.22 wt %, or less than 0.15 wt %. In some embodiments, the concentration of the carbon black is less than 3 wt %. In terms of lower limits, the carbon black concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

(Some of) the components, steps, or features mentioned herein may be considered optional. In some cases, the disclosed compositions may expressly exclude one or more of the aforementioned components in this section, e.g., via claim language, for example as a negative limitation. For example claim language may be modified to recite that the disclosed compositions, processes, etc., do not utilize or comprise one or more of the aforementioned components, e.g., the compositions do not include carbon black. This text serves as basis in the disclosure for negative limitations with respect to the disclosed components, steps, or features and provides support therefor.

Both the filled and neat embodiments each demonstrate the surprising improved mechanical properties. For unfilled resins of polyamides, however, thermal stability is not typically measured by references to the tensile strength of the polyamide composition; rather, thermal stability is often measured using relative thermal index (RTI). RTI refers to the thermal classification of a material by comparing the performance of the material against the performance of a known or reference material. Often, RTI assesses the ability of the material to withstand exposure to high temperatures by measuring the ability of the material to maintain at least 50% of its tensile strength when exposed to various temperatures for set amounts of time. The non-glass-filled embodiments of the heat-stabilized polyamide compositions demonstrate improved RTI.

Performance Characteristics

The aforementioned heat-stabilized polyamide compositions demonstrate surprising performance results. For example, the polyamide compositions demonstrate superior tensile performance over broad (heat age) temperature ranges, even over known performance gaps, e.g., temperature gaps (for example over the entire range from 200° C. to 220° C.). For the reasons discussed above, performance over the entire range is particularly desirable. These performance parameters are exemplary and the examples support other performance parameters that are contemplated by the disclosure. For example, other performance characteristics taken at other heat age temperatures, for example at 210° C., and heat age durations, for example for 3000 hours, are contemplated and may be utilized to characterize the disclosed polyamide compositions.

Furthermore, the heat stabilizer packages have been shown to retard the damage to the polyamides even when exposed to higher temperature. When tensile strength is measured at higher temperatures, the tensile strength of the heat-stabilized polyamide compositions remains surprisingly high. Typically, tensile strength of polyamide compositions is much lower when measured at higher temperatures. While that trend remains true of the heat-stabilized polyamide compositions disclosed herein, the actual tensile strength remains surprisingly high even when measured at temperatures.

Generally, tensile strength measurements may be conducted under ISO 527-1 (2019), Charpy notched impact energy loss of the polyamide composition may be measured using a standard protocol such as ISO 179-1 (2010), and heat aging measurements may be conducted under ISO 180 (2018).

Tensile Strength

In some embodiments, when heat aged for 2500 hours at a temperature of 210° C. and measured at 23° C., the polyamide composition demonstrates a tensile strength of greater than 135 MPa, e.g., greater than 140 MPa, or greater than 145 MPa.

In some embodiments, when heat aged for 3000 hours at a temperature of 210° C. and measured at 23° C., the polyamide composition demonstrates a tensile strength of greater than 140 MPa, e.g., 145 MPa, greater than 150 MPa, greater than 155 MPa, or greater than 160 MPa.

Tensile Elongation

In some embodiments, when heat aged for 2500 hours at a temperature of 210° C. and measured at 23° C., the polyamide composition demonstrates a tensile elongation of greater than 1.25%, e.g., greater than 1.30%, greater than 1.35%, greater than 1.40%, or greater than 1.45%. In some embodiments, when heat aged for 3000 hours at a temperature of 210° C. and measured at 23° C., the polyamide composition demonstrates a tensile elongation of greater than 1.35%, e.g., greater than 1.40%, greater than 1.50%, greater than 1.60%, greater than 1.70%, or greater than 1.80%.

Tensile Strength Retention

Tensile strength retention measures the ability of a composition to maintain tensile strength while heat aged. Tensile strength retention is shown as a percentage of initial (non-heat-aged) tensile strength that remains after heat aging.

In some embodiments, when heat aged for 2500 hours at a temperature of 210° C. and measured at 23° C., the polyamide composition demonstrates a tensile strength retention of greater than 0.70, e.g., greater than 0.75, or greater than 0.80. Additionally, when heat aged for 2500 hours at a temperature of 210° C. and measured at 23° C., the polyamide composition demonstrates a tensile strength retention of greater than 10%, e.g., greater than 15%, or greater than 19%. In some embodiments, when heat aged for 3000 hours at a temperature of 210° C. and measured at 23° C., the polyamide composition demonstrates a tensile strength retention of greater than 0.75, e.g., greater than 0.80, or greater than 0.85.

Tensile properties are not the only mechanical properties of polyamides that suffer from exposure to high temperatures. The damage to polyamides caused by heat manifests itself in a number of ways. It has been found that the heat-stabilized polyamide compositions also show improved resilience to other forms of damage. That is to say, the polyamide compositions exhibit other desirable mechanical properties after having been exposed to high temperatures. One such property is impact resilience. Impact resilience is a metric that relates to the durability of the polyamide composition.

Impact Resilience

When heat aged for 1500-3000 hours over a temperature range of from 200° C. to 220° C. and measured at 23° C., the polyamide composition demonstrates an increased impact resistance.

For instance, in some embodiments, when heat aged for 1500 hours at a temperature of 210° C. and measured at 23° C., the polyamide composition demonstrates an impact resistance of greater than 25 kJ/m$^2$, e.g., greater than 28 kJ/m$^2$, or greater than 30 kJ/m$^2$. Additionally, when heat aged for 1500 hours at a temperature of 210° C. and measured at 23° C., the polyamide composition demonstrates an impact resistance of greater than 10%, e.g., greater than 15%, greater than 20%, or greater than 25%.

In some embodiments, when heat aged for 2000 hours over at a temperature of 210° C. and measured at 23° C., the polyamide composition demonstrates an impact resistance of greater than 20 kJ/m$^2$, e.g., greater than 24 kJ/m$^2$, greater than 26 kJ/m$^2$, greater than 28 kJ/m$^2$, greater than 30 kJ/m$^2$, or greater than 31 kJ/m$^2$. Additionally, when heat aged for 2000 hours at a temperature of 210° C. and measured at 23° C., the polyamide composition demonstrates an impact resistance of greater than 10%, e.g., greater than 15%, greater than 20%, or greater than 25%.

In some embodiments, when heat aged for 2500 hours at a temperature of 210° C. and measured at 23° C., the polyamide composition demonstrates an impact resistance of greater than 26 kJ/m$^2$, e.g., greater than 30 kJ/m$^2$, greater than 35 kJ/m$^2$, or greater than 38 kJ/m$^2$. Additionally, when heat aged for 2500 hours at a temperature of 210° C. and measured at 23° C., the polyamide composition demonstrates an impact resistance of greater than 10%, e.g., greater than 15%, greater than 20%, greater than 25%, greater than 30%, greater than 35%, greater than 40%, greater than 45%, or greater than 50%.

In some embodiments, when heat aged for 3000 hours at a temperature of 210° C. and measured at 23° C., the polyamide composition demonstrates an impact resistance of greater than 26 kJ/m$^2$, e.g., greater than 28 kJ/m$^2$, greater than 30 kJ/m$^2$, or greater than 31 kJ/m$^2$. Additionally, when heat aged for 3000 hours at a temperature of 210° C. and measured at 23° C., the polyamide composition demonstrates an impact resistance of greater than 10%, e.g., greater than 15%, greater than 20%, greater than 25%, greater than 30%, or greater than 35%.

Molded Articles

The present disclosure also relates to articles that include any of the provided impact-modified polyamide compositions. The article can be produced, for example, via conventional injection molding, extrusion molding, blow molding, press molding, compression molding, or gas assist molding techniques. Molding processes suitable for use with the disclosed compositions and articles are described in U.S. Pat. Nos. 8,658,757; 4,707,513; 7,858,172; and 8,192,664, each of which is incorporated herein by reference in its entirety for all purposes. Examples of articles that can be made with the provided polyamide compositions include those used in electrical and electronic applications (such as, but not limited to, circuit breakers, terminal blocks, connectors and the like), automotive applications (such as, but not limited to, air handling systems, radiator end tanks, fans, shrouds, and the like), furniture and appliance parts, and wire positioning devices such as cable ties. For instance, the article may be used for fasteners, circuit breakers, terminal blocks, connectors, automotive parts, furniture parts, appliance parts, cable ties, sports equipment, gun stocks, window thermal breaks, aerosol valves, food film packaging, automotive/vehicle parts, textiles, industrial fibers, carpeting, or electrical/electronic parts.

EXAMPLES

Example 1-5 were prepared by combining components as shown in Table 1 and compounding in a twin screw extruder. Polymers were melted, additives were added to the melt, and the resultant mixture was extruded and pelletized. Percentages are expressed as weight percentages. Each of the examples employed three polyamide components: a PA66/6C polyamide copolymer, a PA66/6 polyamide copolymer, and a PA-6,6 polyamide; a copper-based heat stabilizer; glass fiber; nigrosine; and carbon black.

TABLE 1

Formulations

| Component | Ex. 1 (wt %) | Ex. 2 (wt %) | Ex. 3 (wt %) | Comp. Ex. 4 (wt %) | Comp. Ex. 5 (wt %) |
|---|---|---|---|---|---|
| PA66/6C | 38.43% | 40.73% | 36.83% | 40.73% | 36.38% |
| PA6 | 5.00% | 5.00% | 5.00% | 5.00% | 5.00% |
| PA66/6 | 15.50% | 16.00% | 16.00% | 16.00% | 16.00% |
| Ground PA66 | 0.51% | 0.51% | 0.51% | 0.51% | 0.51% |
| Auerstab HP200 (La(OH)$_3$) | 0.51% | 0.51% | 0.51% | | |
| Cerium hydrate powder | | | | 0.51% | 0.51% |
| Bruggolen TP1805 (copper stabilizer) | 3.10% | | | | |
| Copper-based heat Stabilizer | 0.30% | 0.60% | 4.50% | 0.60% | 4.50% |
| Glass Fiber | 35.00% | 35.00% | 35.00% | 35.00% | 35.00% |
| Nigrosine | 1.50% | 1.50% | 1.50% | 1.50% | 1.50% |
| Carbon Black | 0.15% | 0.15% | 0.15% | 0.15% | 0.15% |
| Total % | 100.00 | 100.00 | 100.00 | 100.00 | 100.00 |

Examples 1-3 represent working examples of the claimed invention, and Comparative Examples 4 and 5 are comparative. In Examples 1-5, the amounts of PA66/6C and PA66/6 were slightly adjusted from Example 1. Examples 2 and 3 were made with 0.51 wt % La(OH)$_3$, while Comparative Examples 4 and 5 were made with 0.51 wt % cerium hydrate powder.

To evaluate heat-aging properties, the Example 2-5 polyamide compositions from Table 1 were heat aged at 210° C. for a specified time period and measured at 23° C. for the following properties: tensile strength, TSR, tensile elongation, tensile modulus, and impact resistance. Each property was measured (i) without any heat aging, (ii) after heat aging for 500 hours at 210° C., (iii) after heat aging for 1000 hours at 210° C., (iv) after heat aging for 1500 hours at 210° C., (v) after heat aging for 2000 hours at 210° C., (vi) after heat aging for 2500 hours at 210° C., and (vii) after heat aging for 3000 hours at 210° C. The results are shown in Table 2, below.

TABLE 2

Heat-aging properties at 210° C.

| Property | Ex. 2 | Ex. 3 | Comp. Ex. 4 | Comp. Ex. 5 |
|---|---|---|---|---|
| Tensile Strength | 184.7 | 193.2 | 195.6 | 194.8 |
| TSR | 1 | 1 | 1 | 1 |
| Tensile Elongation | 3.05 | 3.02 | 2.93 | 3.07 |
| Tensile Modulus | 11310 | 11310 | 11932 | 11634 |
| Impact Res. | 74.40 | 82.73 | 90.01 | 84.58 |
| | | | 1500 h | |
| Tensile Strength | 147.7 | 126.1 | 153.8 | 145.3 |
| TSR | 0.80 | 0.65 | 0.79 | 0.75 |
| Tensile Elongation | 1.69 | 1.18 | 1.71 | 1.46 |
| Tensile Modulus | 11404 | 12436 | 10910 | 12316 |
| Impact Res. | 35.50 | 30.23 | 13.15 | 24.15 |
| | | | 2000 h | |
| Tensile Strength | 137.1 | 109.7 | 135.9 | 104.4 |
| TSR | 0.74 | 0.57 | 0.69 | 0.54 |
| Tensile Elongation | 1.33 | 1.00 | 1.34 | 0.96 |
| Tensile Modulus | 12310 | 11563 | 12646 | 11320 |
| Impact Res. | 33.39 | 31.33 | 26.00 | 20.87 |
| | | | 2500 h | |
| Tensile Strength | 149.83 | | 133.27 | |
| TSR | 0.81 | | 0.68 | |
| Tensile Elongation | 1.47 | | 1.23 | |
| Tensile Modulus | 12400 | | 12833 | |
| Impact Res. | 39.10 | | 25.90 | |

TABLE 2-continued

Heat-aging properties at 210° C.

| Property | Ex. 2 | Ex. 3 | Comp. Ex. 4 | Comp. Ex. 5 |
|---|---|---|---|---|
| | | 3000 h | | |
| Tensile Strength | 164.33 | 117.37 | 135.53 | 111.97 |
| TSR | 0.89 | 0.61 | 0.70 | 0.57 |
| Tensile Elongation | 1.84 | 1.07 | 1.33 | 1.02 |
| Tensile Modulus | 11953 | 11896 | 12530 | 12406 |
| Impact Res. | 38.31 | 32.00 | 27.80 | 23.28 |

As can be seen in Table 2, Examples 2 and 3, containing a lanthanum-based compound, performed significantly better tensile properties when heat aged at 210° C., when compared against Comparative Examples 4 and 5, which do not contain a lanthanum-based compound. Compositionally, the only difference between Example 2 and Comparative Example 4 is the presence of the lanthanum-based compound versus a conventional cerium hydrate powder; likewise, the only difference between Example 3 and Comparative Example 5 is the presence of the lanthanum-based compound versus a conventional cerium hydrate powder.

At 2500 hours, significant differences in tensile strength properties can be seen between Example 2 and Comparative Example 4. In particular, Example 2 performs better than Comparative Example 4 after 2500 hours of heat aging at 210° C. for tensile strength (149.83 vs. 133.27), tensile strength retention (0.81 vs. 0.68), tensile elongation (1.47 vs. 1.23) and impact strength (39.10 vs. 25.90), while maintaining a similar tensile modulus (12400 vs. 12833). At 3000 hours, even more improvements can be seen. Example 2 performs better than Comparative Example 4 after 3000 hours of heat aging at 210° C. for tensile strength (164.33 vs. 135.53), tensile strength retention (0.89 vs. 0.69), tensile elongation (1.84 vs. 1.33) and impact strength (38.31 vs. 27.80), while maintaining a similar tensile modulus (11953 vs. 12530).

Similar results can be seen between Example 3 and Comparative Example 5. In particular, Example 3 performs better than Comparative Example 5 after 3000 hours of heat aging at 210° C. for tensile strength (117.37 vs. 111.97), tensile strength retention (0.61 vs. 0.57), and impact strength (32.00 vs. 23.28), while maintaining a similar tensile modulus (11896 vs. 12406) and tensile elongation (1.07 vs. 1.02).

Embodiments

The following embodiments are contemplated. All combinations of features and embodiments are contemplated.

Embodiment 1: A polyamide composition comprising from 25 wt % to 90 wt % of a first polyamide comprising a non-aromatic polyamide formed from 50 wt % to 90 wt % PA66; from 10-50 wt % of a second polyamide comprising a polyamide copolymer; from 0.01-10 wt % of a first stabilizer comprising a lanthanum-based compound; from 0.01-10 wt % of a second stabilizer comprising a copper-based compound; and from 0-65 wt % filler, wherein, when heat aged for 3000 hours at a temperature of 210° C., the polyamide composition demonstrates an impact resistance of 28 kJ/m$^2$ or greater, as measured at 23° C.; or when heat aged for 3000 hours at a temperature of 210° C., the polyamide composition demonstrates an increased impact resistance of 25% or more, as measured at 23° C., when compared to a similar polyamide composition that does not contain a lanthanum-based compound.

Embodiment 2: An embodiment of embodiment 1, wherein the non-aromatic polyamide of the first polyamide is a cycloaliphatic copolymer comprising from 50 wt % to 90 wt % PA66, and from 10 wt % to 50 wt % cyclohexane diacid.

Embodiment 3: An embodiment of embodiment 2, wherein the non-aromatic polyamide of the first polyamide is a cycloaliphatic copolymer comprising from 60 wt % to 80 wt % PA66, and from 20 wt % to 40 wt % cyclohexane diacid.

Embodiment 4: An embodiment of embodiment 1, wherein the first polyamide comprises PA66/6C.

Embodiment 5: An embodiment of embodiment 1, wherein the first polyamide is present in an amount ranging from 30 wt % to 45 wt %.

Embodiment 6: An embodiment of embodiment 1, wherein the polyamide of the second polyamide is an aliphatic copolymer.

Embodiment 7: An embodiment of embodiment 1, wherein the second polyamide comprises PA66/6.

Embodiment 8: An embodiment of embodiment 1, wherein the second polyamide is present in an amount ranging from 10 wt % to 20 wt %.

Embodiment 9: An embodiment of embodiment 1, wherein the lanthanum-based compound is a lanthanum-based heat stabilizer.

Embodiment 10: An embodiment of embodiment 1, wherein the lanthanum-based compound comprises a lanthanum ligand selected from the group consisting of acetates, hydrates, oxyhydrates, phosphates, bromides, chlorides, oxides, nitrides, borides, carbides, carbonates, ammonium nitrates, fluorides, nitrates, polyols, amines, phenolics, hydroxides, oxalates, oxyhalides, chromoates, sulfates, or aluminates, perchlorates, the monochalcogenides of sulphur, selenium and tellurium, carbonates, hydroxides, oxides, trifluoromethanesulphonates, acetylacetonates, alcoholates, 2-ethylhexanoates, or combinations thereof.

Embodiment 11: An embodiment of embodiment 10, wherein the lanthanum-based compound is lanthanum hydroxide.

Embodiment 12: An embodiment of embodiment 1, wherein the composition comprises at least one additional polyamide.

Embodiment 13: An embodiment of embodiment 12, wherein the additional polyamide is PA66 and/or PA6.

Embodiment 14: An embodiment of embodiment 13, wherein the PA6 is present in an amount ranging from 1 wt % to 10 wt %.

Embodiment 15: An embodiment of embodiment 1, wherein the non-aromatic structure of the first polyamide crystallizes or co-crystallizes with the acids of the other polyamide(s).

Embodiment 16: An embodiment of embodiment 1, wherein the filler comprises a glass fiber.

Embodiment 17: An embodiment of embodiment 16, wherein the glass fiber is present in an amount ranging from 25 wt % to 50 wt %.

Embodiment 18: An embodiment of embodiment 1, wherein the first stabilizer is present in an amount ranging from 0.1 wt % to 1 wt %.

Embodiment 19: An embodiment of embodiment 1, wherein the second stabilizer is present in an amount ranging from 1 wt % to 5 wt %.

Embodiment 20: An embodiment of embodiment 1, wherein the first stabilizer is present in an amount ranging from 0.1 wt % to 1 wt %, the second stabilizer is present in an amount ranging from 1 wt % to 5 wt %.

Embodiment 21: An embodiment of embodiment 1, wherein the polyamide composition, when heat aged for 3000 hours at a temperature of 210° C., demonstrates an impact resistance of 30 kJ/m$^2$ or greater, as measured at 23° C.

Embodiment 21: An embodiment of embodiment 1, wherein the polyamide composition, when heat aged for 3000 hours at a temperature of 210° C., demonstrates an increased impact resistance of 30% or more, as measured at 23° C., when compared to a similar polyamide composition that does not contain a lanthanum-based compound.

Embodiment 21: An embodiment of embodiment 22, wherein the polyamide composition, when heat aged for 3000 hours at a temperature of 210° C., demonstrates an increased impact resistance of 35% or more, as measured at 23° C., when compared to a similar polyamide composition that does not contain a lanthanum-based compound.

Embodiment 24: An article for use in high temperature applications, wherein the article is formed from the embodiment of embodiment 1, wherein the article is used for fasteners, circuit breakers, terminal blocks, connectors, automotive parts, furniture parts, appliance parts, cable ties, sports equipment, gun stocks, window thermal breaks, aerosol valves, food film packaging, automotive/vehicle parts, textiles, industrial fibers, carpeting, or electrical/electronic parts.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit.

We claim:

1. A polyamide composition comprising:
from 25 wt % to 90 wt % of a first polyamide comprising a non-aromatic polyamide, the non-aromatic polyamide being a cycloaliphatic copolymer derived from 50 wt % to 90 wt % PA66 and from 10 wt % to 50 wt % cyclohexane diacid;
from 10-50 wt % of a second polyamide comprising a polyamide copolymer;
from 0.01-10 wt % of a first stabilizer comprising a lanthanum-based compound;
from 0.01-10 wt % of a second stabilizer comprising a copper-based compound;
and from 0-65 wt % filler,
wherein, when heat aged for 3000 hours at a temperature of 210° C., the polyamide composition demonstrates an impact resistance of 28 KJ/m² or greater, as measured at 23° C.; or when heat aged for 3000 hours at a temperature of 210° C., the polyamide composition demonstrates an increased impact resistance of 25% or more, as measured at 23° C., when compared to a similar polyamide composition that does not contain a lanthanum-based compound.

2. The composition of claim 1, wherein the cycloaliphatic copolymer contains from 60 wt % to 80 wt % PA66 and from 20 wt % to 40 wt % cyclohexane diacid.

3. The composition of claim 1, wherein the first polyamide is present in an amount ranging from 30 wt % to 45 wt %.

4. The composition of claim 1, wherein the polyamide of the second polyamide is an aliphatic copolymer.

5. The composition of claim 1, wherein the second polyamide comprises PA66/6.

6. The composition of claim 5, wherein the second polyamide is present in an amount ranging from 10 wt % to 20 wt %.

7. The composition of claim 1, wherein the lanthanum-based compound is a lanthanum-based heat stabilizer.

8. The composition of claim 1, wherein the lanthanum-based compound comprises a lanthanum ligand selected from the group consisting of acetates, hydrates, oxyhydrates, phosphates, bromides, chlorides, oxides, nitrides, borides, carbides, carbonates, ammonium nitrates, fluorides, nitrates, polyols, amines, phenolics, hydroxides, oxalates, oxyhalides, chromoates, sulfates, or aluminates, perchlorates, the monochalcogenides of sulphur, selenium and tellurium, carbonates, hydroxides, oxides, trifluoromethanesulphonates, acetylacetonates, alcoholates, 2-ethylhexanoates, or combinations thereof.

9. The composition of claim 8, wherein the lanthanum-based compound is lanthanum hydroxide.

10. The composition of claim 1, wherein the composition comprises at least one additional polyamide, and wherein the additional polyamide is PA66 and/or PA6.

11. The composition of claim 10, wherein the PA6 is present in an amount ranging from 1 wt % to 10 wt %.

12. The composition of claim 1, wherein the non-aromatic structure of the first polyamide crystallizes or co-crystallizes with the acids of the other polyamide(s).

13. The polyamide composition of claim 1, wherein the filler comprises a glass fiber, and wherein the glass fiber is present in an amount ranging from 25 wt % to 50 wt %.

14. The polyamide composition of claim 1, wherein the first stabilizer is present in an amount ranging from 0.1 wt % to 1 wt %.

15. The polyamide composition of claim 1, wherein the second stabilizer is present in an amount ranging from 1 wt % to 5 wt %.

16. The polyamide composition of claim 1, wherein the first stabilizer is present in an amount ranging from 0.1 wt % to 1 wt %, the second stabilizer is present in an amount ranging from 1 wt % to 5 wt %.

17. The polyamide composition of claim 1, wherein the polyamide composition, when heat aged for 3000 hours at a temperature of 210° C., demonstrates an impact resistance of 30 kJ/m² or greater, as measured at 23° C.

18. The polyamide composition of claim 1, wherein the polyamide composition, when heat aged for 3000 hours at a temperature of 210° C., demonstrates an increased impact resistance of 30% or more, as measured at 23° C., when compared to a similar polyamide composition that does not contain a lanthanum-based compound.

19. The polyamide composition of claim 18, wherein the polyamide composition, when heat aged for 3000 hours at a temperature of 210° C., demonstrates an increased impact resistance of 35% or more, as measured at 23° C., when compared to a similar polyamide composition that does not contain a lanthanum-based compound.

20. An article for use in high temperature applications, wherein the article is formed from the polyamide composition of claim 1, wherein the article is used for fasteners, circuit breakers, terminal blocks, connectors, automotive parts, furniture parts, appliance parts, cable ties, sports equipment, gun stocks, window thermal breaks, aerosol valves, food film packaging, automotive/vehicle parts, textiles, industrial fibers, carpeting, or electrical/electronic parts.

21. A polyamide composition comprising:
from 25 wt % to 90 wt % of a first polyamide comprising PA66/6C;
from 10-50 wt % of a second polyamide comprising a polyamide copolymer;
from 0.01-10 wt % of a first stabilizer comprising a lanthanum-based compound;
from 0.01-10 wt % of a second stabilizer comprising a copper-based compound; and
from 0-65 wt % filler,
wherein, when heat aged for 3000 hours at a temperature of 210° C., the polyamide composition demonstrates an impact resistance of 28 kJ/m² or greater, as measured at 23° C.; or when heat aged for 3000 hours at a temperature of 210° C., the polyamide composition demonstrates an increased impact resistance of 25% or more, as measured at 23° C., when compared to a similar polyamide composition that does not contain a lanthanum-based compound.

22. A polyamide composition comprising:
from 25 wt % to 90 wt % of a first polyamide, the first polyamide being a cycloaliphatic copolymer formed from PA66 and cyclohexane diacid;
from 10-50 wt % of a second polyamide, the second polyamide being a polyamide copolymer;
from 0.01-10 wt % of a first stabilizer comprising a lanthanum-based compound;
from 0.01-10 wt % of a second stabilizer comprising a copper-based compound;
and from 0-65 wt % filler.

* * * * *